Patented May 19, 1936

2,040,971

UNITED STATES PATENT OFFICE 2,040,971

CELLULOSE ESTER COMPOSITION

Harold Allden Auden, Banstead, and Hanns Peter Staudinger, Epsom, England, assignors to Ernst Berl, Pittsburgh, Pa.

No Drawing. Application January 2, 1935, Serial No. 176. In Great Britain December 8, 1933

2 Claims. (Cl. 106—40)

This invention relates to cellulose ester products, such as films, wrappings, sheets, threads, plastic compositions, mouldings and so forth, also coating compositions such as lacquers or water-proofing material capable of being applied to metal, paper, glass, leather and other materials, and has for its chief object to enable such products to be manufactured from cellulose esters, particularly cellulose triacetate, in such a manner that the product is stable and durable and when formed into thin sheets or threads is free from liability to crack or become brittle.

According to the present invention organic cellulose esters, particularly cellulose triacetate, have incorporated in them one or other of the following esters as constituents depending upon the nature of the product aimed at, namely, a citric acid ester of an aliphatic alcohol, of an aromatic alcohol or of a hydroaromatic alcohol, or one or more esters of maleic acid or of ketocarboxylic acids, these esters being such as have a boiling point of at least 150° C. under normal atmospheric pressure. In the case of the citric acid esters their incorporation has the effect of a plasticizer in that it increases and maintains the flexibility of cellulose acetate films to a marked degree; it also has the effect of increasing the elongation property of threads and thereby permits of a certain amount of stretching during spinning operations. Moreover, by washing out the plasticizer the product is left with a matt surface. In the case of the other esters, their incorporation has the effect of forming valuable coating compositions.

The amount of the incorporated ester in the final product may vary to a considerable extent and may constitute as much as 60 per cent. of the whole.

The most convenient mode of incorporation is to form a solution of the cellulose ester in a suitable solvent and work the additional ester into the solution.

In the case of having incorporated an ester giving a product suitable for making a complete article thereof, the mixture may then be treated in any known manner to produce the finished article such as a film, thread or moulding. For example in the case of making films, the mixture is spread out upon a roller or endless band. As the products of such mixtures have a high dielectric constant they may also be employed in the electrical industry as for example by being moulded into electrically resistant articles.

In the case of incorporating an ester giving a product suitable as a coating composition the cellulose ester solution in which it is incorporated may for example be a solution of acetone-soluble cellulose acetate in acetone, or of fibrous cellulose triacetate in methylene chloride. If desired, known plasticizers or natural or synthetic resins may also be worked into the composition.

As examples of citric acid esters amyl or butyl citrate may be mentioned as esters of aliphatic alcohols, benzyl citrate as an ester of an aromatic alcohol, and cyclohexyl citrate as an ester of a hydroaromatic alcohol. Mixed esters as for example amyl dibutyl citrate may also be used, or mixtures of citric esters of different alcohols.

Suitable esters of maleic acid or ketocarboxylic acids are the esters of aliphatic alcohols such as butyl and amyl alcohol, of hydro-aromatic alcohols such as cyclo-hexanyl alcohol and of aromatic alcohols such as benzyl alcohol. As examples of ketocarboxylic acids may be mentioned levulinic and pyruvic acids.

The following examples illustrate the manner in which the invention may be carried into effect in specific cases:—

Example I

A highly and permanently flexible film can be prepared containing 25 per cent. of citric acid ester by compounding the following substances in the following proportions:—15 parts by weight of cellulose triacetate are dissolved in a mixture of 72 parts by weight of methylene chloride and 8 parts by weight of ethyl alcohol, and to this solution is added 5 parts by weight of triamyl citrate. This mixture can be worked up into film form by spreading it on a roller or endless band.

Example II

In the case of using amyl citrate for making a silk spinning mixture the following proportions are suitable:—

| | Parts by weight |
|---|---|
| Cellulose triacetate | 100 |
| Methylene chloride | 350 |
| Alcohol | 75 |
| Triamyl citrate | 15 |

Example III

A composition involving the use of tribenzyl citrate and suitable for casting a film is as follows:—

| | Parts by weight |
|---|---|
| Cellulose triacetate | 100 |
| Methylene chloride | 420 |
| Alcohol | 80 |
| Tribenzyl citrate | 20 |

Example IV

A composition involving the use of cyclo-hexyl citrate and suitable for casting a film is the following:—

| | Parts by weight |
|---|---|
| Cellulose triacetate | 30 |
| Methylene chloride | 120 |
| Ethyl alcohol | 20 |
| Cyclo-hexyl citrate | 9 |

Example V

A composition suitable for coating metal is as follows:—

| | Parts by weight |
|---|---|
| Cellulose triacetate | 15 |
| Methylene chloride | 75 |
| Amyl alcohol | 15 |
| Butyl levulinate | 8 |
| Resin | 0.3 |

Example VI

A composition suitable for casting films is as follows:—

| | Parts by weight |
|---|---|
| Cellulose triacetate | 20 |
| Diethylene chloride | 80 |
| Ethyl alcohol | 10 |
| Benzyl ester of maleic acid | 15 |
| Ethyl ester of maleic acid | 5 |

Example VII

A coating composition is as follows:—

| | Parts by weight |
|---|---|
| Cellulose triacetate | 30 |
| Methylene chloride | 100 |
| Ethyl alcohol | 30 |
| Normal butyl pyruvate | 6 |

What we claim is:—

1. A composition for producing matt surfaced artificial silk threads comprising essentially a mixture of cellulose triacetate and amyl citrate, said amyl citrate in a quantity sufficient to produce said matt surface.

2. A composition for producing matt surfaced artificial silk threads comprising essentially a mixture of about 100 parts cellulose triacetate and about 15 parts amyl citrate.

HAROLD ALLDEN AUDEN.
HANNS PETER STAUDINGER.